United States Patent
Mains et al.

(10) Patent No.: US 8,507,045 B2
(45) Date of Patent: Aug. 13, 2013

(54) SIZING ADDITIVES FOR DRYCLEANING PROCESSES

(75) Inventors: Harold Eugene Mains, Cincinnati, OH (US); Laura Ruth Pero, Bethel, OH (US)

(73) Assignee: Fabritec International Corporation, Cold Spring, KY (US)

( * ) Notice: Subject to any disclaimer, the term of this patent is extended or adjusted under 35 U.S.C. 154(b) by 0 days.

(21) Appl. No.: 13/528,434

(22) Filed: Jun. 20, 2012

(65) Prior Publication Data

US 2012/0329349 A1 Dec. 27, 2012

Related U.S. Application Data

(60) Provisional application No. 61/501,612, filed on Jun. 27, 2011.

(51) Int. Cl.
*B05D 3/02* (2006.01)

(52) U.S. Cl.
USPC .......................... 427/389.9; 427/394

(58) Field of Classification Search
None
See application file for complete search history.

(56) References Cited

U.S. PATENT DOCUMENTS

| | | | | |
|---|---|---|---|---|
| 2,288,432 A * | 6/1942 | Billing | | 8/495 |
| 5,196,132 A * | 3/1993 | Mains et al. | | 510/285 |
| 6,063,135 A | 5/2000 | Berndt et al. | | |
| 6,521,580 B2 | 2/2003 | Perry et al. | | |
| 6,613,733 B1 * | 9/2003 | Barnabas et al. | | 510/470 |
| 7,601,681 B2 | 10/2009 | Smets et al. | | |
| 2002/0004953 A1 | 1/2002 | Perry et al. | | |
| 2010/0293723 A1 | 11/2010 | Racette et al. | | |

OTHER PUBLICATIONS

"Information about volatile silicone fluids", Dow Corning 1982. (1 p.).
"D5 in Dry Cleaning" Fact Sheet, SEHSC, Feb. 2008, Herndon, VA. (2 pp.).
"Substance Profile for the Challenge Resin Acids and Rosin Acids, Hydrogenated, Esters with Glycerol," Existing Substances Evaluation, Chemical Abstracts Service Registry No. 65997-13-0, Environment Canada Health Canada, www.ec.gc.ca, Jun. 2009. (16 pp.).
Foral AX Product Data Sheet, Pinova Inc., No. 4267, Brunswick, GA, Nov. 2010. (2 pp).
Foral 85 Product Data Sheet, Pinova Inc., No. 4264, Brunswick, GA, Nov. 2010. (2 pp).
Foral 3085 Product Data Sheet, Pinova Inc., No. 4266, Brunswick, GA, Nov. 2010. (2 pp).

* cited by examiner

*Primary Examiner* — Erma Cameron
(74) *Attorney, Agent, or Firm* — Wood, Herron & Evans, LLP

(57) ABSTRACT

A fabric treatment composition including a sizing agent and a silicone solvent is provided. The sizing agent is a hydrogenated rosin ester. The silicone solvent is a volatile silicone solvent. Optionally, co-solvents and dispersing agents may be included. A method of treating a fabric article and the treated fabric article are provided.

10 Claims, 1 Drawing Sheet

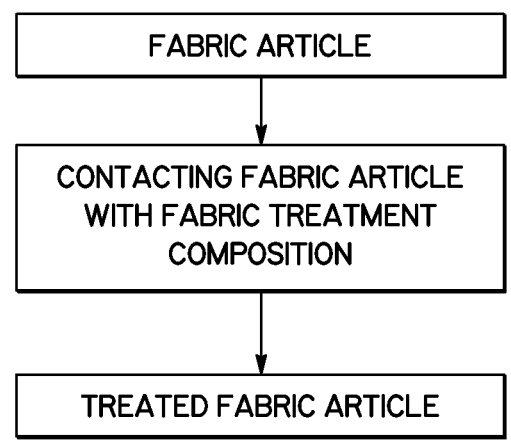

SIZING ADDITIVES FOR DRYCLEANING PROCESSES

CROSS-REFERENCE TO RELATED APPLICATIONS

This application claims benefit of and priority to prior filed and U.S. Provisional Patent Application Ser. No. 61/501,612 entitled "SIZING ADDITIVES FOR DRYCLEANING PROCESSES," filed on Jun. 27, 2011, which is expressly incorporated by reference herein in its entirety.

FIELD OF USE

This invention relates to dry cleaning compositions and methods that provide sizing and body to articles and garments.

BACKGROUND

The majority of drycleaners today clean with the solvent perchloroethylene, also known as tetrachloroethylene or "PERC". PERC has been in common use since the 1940's and it is very effective in removing soils from garments that must be drycleaned. PERC is non-flammable, easily purified by distillation, and does not easily break down to form corrosive agents. Additionally, PERC does not contribute to the formation of smog.

Despite the foregoing, there has been a movement to replace PERC in the dry cleaning industry. One class of solvents that has evolved as a PERC-replacement in the dry cleaning industry is silicone solvents, such as straight chain and cyclic silicones. Silicone solvents have been used for decades in products such as cosmetics, deodorants, skin preparations, bath oils, suntan preparations, shaving products and hair products, and are characterized as possessing favorable properties such as low-odor and low-surface tension. Additionally, silicone solvents are non-greasy, non-toxic (oral, dermal, inhalation), non-irritating, non-sensitizing, and have no immunosuppressant effects.

One exemplary silicone solvent is decamethylcyclopentasiloxane, which is also known as D5 cyclomethicone and exhibits ideal properties for a drycleaning fluid. See U.S. Pat. No. 6,063,135 issued on May 16, 2000, which is hereby incorporated by reference in its entirety. Decamethylcyclopentasiloxane has a high flashpoint at 170° F., distills easily in a vacuum still, has anti-dye bleeding properties, is static free, safe on all fabrics and resists wrinkling. However, one of the main complaints of silicone fluid cleaned garments is that the cleaned fabrics have a limp hand with no body. To address the poor hand, drycleaners add sizing additives to the solvent to add body and to aid in retaining creases. The sizing additives are typically thermoplastic hydrocarbon resins derived from natural terpene hydrocarbons or petroleum sources. Unfortunately, these resins are not soluble in decamethylcyclopentasiloxane dry cleaning fluid.

Therefore, a need exists for new sizing agents that are soluble in silicone solvents.

SUMMARY

According to an embodiment of the invention, a fabric treatment composition is provided. The composition includes a sizing agent and a silicone solvent, where the sizing agent includes a hydrogenated rosin ester.

According to another embodiment of the invention, a method for applying a fabric treatment composition to a fabric article in a dry cleaning appliance is provided. The method includes the steps of (a) dispensing a fabric treatment composition into the treatment chamber, wherein fabric treatment composition includes a sizing agent comprising a hydrogenated rosin ester, and (b) contacting the fabric article with the fabric treatment composition.

According to yet another embodiment of the invention, a treated fabric article is provided. The treated fabric article includes a fabric article having a residue of a sizing agent thereon. The sizing agent includes a hydrogenated rosin ester.

BRIEF DESCRIPTION OF THE DRAWINGS

The accompanying drawings, which are incorporated in and constitute a part of this specification, illustrate embodiments of the invention and, together with the brief description given above and a detailed description of the embodiments given below, serve to explain the principles of the embodiments of the invention.

FIG. 1 illustrates a method of treating a fabric article to provide a treated fabric article, in accordance with an embodiment of the present invention.

DETAILED DESCRIPTION OF EMBODIMENTS OF THE INVENTION

As commonly done in aqueous systems, sizing agents are generally applied to fabric articles as dilute solutions. Sizing agents impart improved physical properties, such as crease retention, to a fabric article. Moreover, the sizing agents can also improve the "hand" of the fabric article, i.e., improve the tactile qualities such as softness, firmness, elasticity, fineness, resilience and other qualities perceived by touch. The sizing agents of embodiments of the present invention are compatible with non-aqueous dry cleaning systems, which utilize a silicone solvent as the carrier medium.

Thus, according to embodiments of the invention, a fabric treatment composition is provided, the composition including a sizing agent and a silicone solvent. Moreover, a method for applying the fabric treatment composition to a fabric article in a dry cleaning appliance includes the steps of: (a) dispensing a fabric treatment composition into the treatment chamber, wherein fabric treatment composition includes a sizing agent comprising a hydrogenated rosin ester; and (b) contacting the fabric article with the fabric treatment composition. In alternative embodiments, the method may further include placing the fabric article into the drying cleaning appliance, providing a concentrated mixture of the fabric treatment composition, diluting the concentrated mixture with an additional amount of the silicone solvent to form an operative mixture of the fabric treatment composition, evaporating at least a portion of the solvent after the contacting step to thereby provide the fabric article with at least a portion of the sizing agent retained thereon, and/or combinations thereof.

In an embodiment, the fabric treatment composition is added to the dry cleaning appliance after a wash process step. Accordingly, the drycleaning appliance may be charged with a fabric article and a cleaning solution comprising a detergent, where the fabric article is contacted by the cleaning solution for a suitable duration (e.g., about 5 to about 20 minutes). If desired, a portion of the cleaning solution may be removed from the drycleaning appliance after the wash process step and prior to introducing the fabric treatment composition to the drycleaning appliance. Removal of a portion of the cleaning solution reduces the dilution effect on the fabric treatment composition, thereby providing a more concentrated solution of sizing agent during the treatment step.

According to various embodiments of the invention, the contacting duration varies depending on the cleaning needs and generally for a time effective to substantially clean the fabric and provide the desired sizing effect. For example, the contacting duration may range from less than about 1 minute to about 20 minutes, from about 1 minute to about 15 minutes, from about 3 minutes to about 10 minutes, or about 2 minutes to about 5 minutes, for example. After the contacting period, a portion of the fabric treatment composition may be separated from the fabric article and the remaining or residual silicone solvent may be distilled and recovered, which thereby deposits at least a portion of the sizing agent on the fabric article to provide a treated fabric article. For example, according to an embodiment, a bulk portion of the fabric treatment composition is drained from the drycleaning appliance to a holding tank or distillation unit after the desired contacting duration. Afterwards, the treated fabric article may be subjected to centrifugal force to extract another portion of the remaining fabric treatment composition from the treated fabric article. Removal of the volatile silicone solvent by evaporation thereby deposits the sizing agent contained therein on to the fabric article.

In view thereof, similar to other conventional dry cleaning sizing products, the sizing effects are determined by the amount of sizing agent retained on the fabric article after removal of the silicone solvent and any subsequent extraction rinses. Accordingly, the sizing effect depends on a number of factors such as the rate of distillation, the concentration of the sizing agent in the fabric treatment composition, and the extraction force.

Suitable sizing agents are based on rosin acids ($C_{20}H_{30}O_2$), which are components of tall oil. Tall oil is a dark odorous liquid that is a common by-product of a paper making process from wood pulp derived from coniferous trees, such as pine trees. Abietic acid (which is also known as abietinic acid or sylvic acid) is the most abundant of several closely-related organic acids that constitute most of the rosin. Further, this wood-based rosin may also include, for example, pimaric acid, palustric acid, isopimaric acid, dehydroabietic acid, neoabietic acid and other resins and neutrals. For example, the wood-based rosin may include 40-46% abietic acid, 3-7% pimaric acid, 4-8% palustric acid, 11-15% isopimaric acid, 8-12% dehydroabietic acid, 3-5% neoabietic acid and 6-8% other resins and 10-14% neutrals, wherein the percentages are based on a weight percent of the total composition.

Accordingly, the sizing agents of embodiments of the invention are derived from rosin acids, such as abietic acid, which have been hydrogenated and esterified, and are thus, hydrogenated rosin esters. After hydrogenation, the mixture may include predominantly dihydroabietic acid and tetrahydroabietic acid, with some dehydroabietic acid and lesser amounts of other rosin acids. As such, sizing agents of embodiments of the invention include hydrogenated rosin esters of a hydrogenated wood rosin. Hydrogenated rosin has greater resistance to oxidation than its non-hydrogenated variant, has less odor, less taste, and higher stability to light. Foral® AX synthetic resin, which is hydrogenated wood rosin and is commercially available from Pinova, Inc. (Brunswick, Ga.), is a suitable precursor for the sizing agents disclosed herein.

According to one embodiment of the invention, the hydrogenated rosin ester is a polyol ester of a hydrogenated rosin acid, which may be derived from polyols such as diols, triols, tetraols and the like. Exemplary diol esters include a diol moiety such as triethylene glycol or the like. Other exemplary polyol esters may include other polyol moieties, such as glycerol, pentaerythritol, or the like. The polyol moiety, which affects the softening point and the solubility of the hydrogenated rosin ester, may be modified accordingly. Exemplary commercially available hydrogenated rosin esters include products that are available from Pinova, Inc. (Brunswick, Ga.) under the tradenames Foral® 85, Foral® 105, and Foral® 3085. These resins, a priori, would seem not to be soluble in silicone solvents due to their chemical composition, but show remarkable solubility in various silicone dry cleaning solvents and provide unexpected sizing properties.

Typical compositions for the Foral® hydrogenated rosin esters are provided below. These are typical values, but compositions may vary outside these ranges. Foral® 85 glycerol ester of hydrogenated rosin includes free resin acids=3-5%; mono-ester=1-3%; di-ester=20-30%; tri-ester=55-65%; and neutrals and other components=5-10%. Foral® 105 pentaerythritol ester of hydrogenated rosin: free resin acids=4-9%; mono-ester=1-3%; di-ester=5-10%; tri-ester=35-45%; tetra-ester=40-50%; neutrals and other components=5-10%, wherein the percentages are based on a weight percent of the total composition.

Compounds suitable as the silicone solvent include volatile siloxanes having linear, branched, or cyclic structures. Volatile siloxane solvents generally contain a polysiloxane structure that includes from 2 to 20 silicon atoms and have, for example, a boiling of below about 300° C. point at a pressure of 760 millimeters of mercury ("mm Hg"). Exemplary linear or branched, volatile siloxane include, but are not limited to, one or more of hexamethyldisiloxane, octamethyltrisiloxane, decamethyltetrasiloxane, dodecamethylpentasiloxane, tetradecamethylhexasiloxane, hexadecamethylheptasiloxane or methyltris(trimethylsiloxy)silane. Exemplary cyclic siloxane solvents, include but are not limited to, octamethylcyclotetrasiloxane, decamethylcyclopentasiloxane, dodecamethylcyclohexasiloxane, tetradecamethylcyclohepta-siloxane. According to one embodiment, decamethylcyclopentasiloxane is used as the dry cleaning medium.

It is advantageous to provide the sizing agent as a concentrated product which may be added to bulk quantities of the dry cleaning medium. Accordingly, other additives, such as co-solvents and dispersing aids, may be included in the fabric treatment composition to provide a concentrate that readily disperses and mixes into the bulk dry cleaning medium of silicone solvent.

Suitable co-solvents include those solvents that do not cause deleterious effects to the fabric article or the dry cleaning equipment, and do not produce unacceptable odors. For safety, the co-solvent may advantageously have a flash point near or greater than of the volatile siloxane solvent, such as 170° C. or greater. Exemplary co-solvents include, but are not limited to, dipropylene glycol monomethyl ether, dipropylene glycol monobutyl ether, dipropylene glycol monoethyl acetate, dipropylene glycol monopropyl acetate, dipropylene glycol monobutyl acetate, diethylene glycol monomethyl ether, diethylene glycol monobutyl ether, diethylene glycol monoethyl acetate, diethylene glycol monopropyl acetate, or diethylene glycol monobutyl acetate, and the like. According to one example, the co-solvent is dipropylene glycol monomethyl ether.

Suitable dispersing agents include various distilled petroleum products, such as light mixture of alkanes in the C15 to C40 range. Exemplary dispersing aids include, but are not limited to mineral oils, such as white mineral oil. According to one example, the dispersing agent is white mineral oil 70 USP, which is a medium viscosity white mineral oil and is commercially available from Ashland Chemical Company.

Suitable fabrics articles useful in practicing embodiments of the present invention include those articles comprising natural fibers. Non-limiting examples of natural fibers include wool, cotton, silk, and flax. Other suitable fabric articles include those articles comprising natural and synthetic fibers. Non-limiting examples of synthetic fibers include, polyesters, nylons, polyacrylics, and polyolefins.

According to various embodiments of the invention, a concentrated mixture of the fabric treatment composition includes about 25 wt % to about 45 wt % of the hydrogenated rosin ester; about 25 wt % to about 35 wt % of the silicone solvent; about 2 wt % to about 15 wt % of the dispersing agent; and about 25 wt % to about 35 wt % of the co-solvent, wherein the weight percent is based on the total weight of the concentrated mixture. For example, the fabric treatment composition concentrate may include about 35 wt % of the hydrogenated rosin ester, about 30 wt % of the silicone solvent, about 5% of the dispersing agent, and about 30 wt % of the co-solvent. In one example, the fabric treatment composition concentrate includes about 35 wt % of Foral® 85 resin, about 30 wt % of decamethylcyclopenta-siloxane, about 5% of white mineral oil, and about 30 wt % of dipropyleneglycol monomethyl ether.

The fabric treatment composition concentrate may be diluted with one or more non-aqueous dry cleaning solvents, such as a siloxane solvent to form an operative mixture of the fabric treatment composition. As used herein, the operative mixture of the fabric treatment composition are those compositions that are used to contact the sizing agent and the fabric article. Accordingly, the operative mixture of the fabric treatment composition may include about 0.1 wt % to about 5 wt % of the hydrogenated rosin ester, wherein the weight percent is based on the total weight of the operative mixture. For example, the wt % of the hydrogenated rosin ester may be within the range from about 0.2 wt % to about 5 wt %; from about 0.3 wt % to about 3 wt %; from about 0.4 wt % to about 2 wt %; or about 0.5 to about 2 wt % based on the total weight of the operative mixture. According to one embodiment, the operative mixture of the fabric treatment composition is about 0.5 wt % to about 3 wt % of a fabric treatment composition concentrate having about 25 wt % to about 45 wt % of the hydrogenated rosin ester; about 25 wt % to about 35 wt % of the silicone solvent; about 2 wt % to about 15 wt % of the dispersing agent; and about 25 wt % to about 35 wt % of the co-solvent, wherein the weight percent is based on the total weight of the concentrated mixture.

The embodiments of the invention are illustrated by the following examples that are not to be regarded as limiting the scope of the invention or the manner in which it can be practiced.

EXPERIMENTAL

Drape Stiffness: The "drape stiffness" test measures the resistance to bending of a material. The sizing properties of the resins of this invention were determined via measuring flexural rigidity (stiffness) using DRAPE-FLEX Stiffness Devise made by Fabric Development Tests located in Brooklyn, N.Y. Strips (2.5×15 centimeters) of un-sized 100% cotton are treated with solutions of the resins at various concentrations. The test strips are cut in both fabric width and lengths and the results of each pair are averaged. The drape or stiffness of the test strips is determined by the test strip breaking at a 45 degree plane from horizontal. The results are measured in centimeters at the 45 degree break. The higher the number, the more fabric stiffness or body or hand that was imparted to the test fabric. The strips were soaked in solvent solutions (0, 1, 2, or 3% by weight in PERC) containing the test resins for ten minutes, drained and air dried. The dried strips were then pressed to remove any inadvertent wrinkles. The strips are then placed on the DRAPE-FLEX tester and measured.

Example 1

α-Pinene/β-Pinene copolymer; 0% (4.4 cm); 1% (6.8 cm); 2% (8.2 cm); and 3% (9.3 cm).

Example 2

Rosin Ester Resin 1 (Foral® 85 from Pinova, Inc. (Brunswick, Ga.)): 0% (4.4 cm); 1% (7.1 cm); 2% (9.0 cm); and 3% (9.6 cm).

Example 3

Rosin Ester Resin 2 (Foral® 105 from Pinova, Inc. (Brunswick, Ga.)): 0% (4.4 cm); 1% (6.5 cm); 2% (9.1 cm); and 3% (9.8 cm).

Example 4

Rosin Ester Resin 3 (Foral® 3085 from Pinova, Inc. (Brunswick, Ga.)): 0% (4.4 cm); 1% (6.7 cm); 2% (7.7 cm); and 3% (9.9 cm).

The foregoing results demonstrate that the rosin ester resins 1-3 provide comparable sizing characteristics to that of a known sizing agent, i.e., α-pinene/β-pinene copolymer.

Example 5

Test Product Batch

Dipropyleneglycol monomethyl ether, 900 pounds (30 wt %); Ge silicone PPP-SB 32, 900 pounds (30 wt %); white mineral oil, 50 pounds (5 wt %); and Pinova® Foral® 85 Resin, 1,150 pounds (35 wt %).

1 inch×8 inch 100% cotton fabric pieces were tested using decamethylcyclopenta-siloxane as the dry cleaning fluid. The swatches were cut from fabric in both the length and width (woof/weft and fill) directions. The swatches were soaked in 0, 1 and 3 wt % concentrations of the test product batch in silicone dry cleaning solvent for 10 minutes. The swatches were air dried, oven dried at 75° C. for at least 30 minutes and conditioned, and finally ironed to remove wrinkles prior to testing. The stiffness of swatches was tested three times via the Drape Flex Tester, and the width and length fabric test strip results were averaged; the higher the number the more rigid the fabric.

TABLE 1

Flex test results using test product batch of Foral ® 85 resin.

| | Sizing Concentration | | |
| --- | --- | --- | --- |
| | 0% | 1.0% | 2.0% |
| Length (cm) | 4.5 | 4.6 | 6.2 |
| Width (cm) | 3.6 | 3.9 | 4.7 |
| Total (cm) | 8.1 | 8.5 | 10.9 |

The benefits of using sizing products in dry cleaning are considerable. Sizing enhances the wear ability, drape and feel of garments that require dry cleaning. Garments contain finishes that are removed during the dry cleaning process leaving the fabric limp, lifeless and often out of shape. Finishing garments is made more difficult. Adding sizing during the dry cleaning adds body, enhanced feel to the fabrics and the finished garments retain their shape longer.

The sizing agents of embodiment of the invention enhance the hand of the dry cleaned garment, aids in finishing, and enhances fabric appearance. It was noted that tailored garments such as suits have a luxurious brighter appearance. Unexpectedly, it was observed that dark wools do not attract or hold lint.

One manner of using the fabric treatment concentrate is to introduce it into the machine via injection controls of a standard dry cleaning unit. This allows the operator to select the specific loads of fabric articles to receive the sizing agent treatment. One manner of treating fabric articles is to inject a detergent, which is used to "clean" the articles, and then introduce the sizing agent at a different time than that for introducing the detergent.

Normally most dry cleaning units are made with two separate solvent tanks; a clean tank containing new or distilled solvent and a work tank containing solvent with detergent and additives which is used to clean the garments and/or articles. In practice, operators of dry cleaning units add makeup solvent (new/distilled or reclaimed solvent based on pounds cleaned) with any detergent or additives once a day in order to maintain the target "Charge".

For example, an old method of adding detergent and other additives to dry cleaning cleaning machines still in use today is the "Charge Method". Essentially it involves mixing and dissolving the additive/product in the dry cleaning solvent at a specific concentration. In practice the "Charge" is typically in the 0.5 to 1.0 vol % range. For example, for a 1 vol % charge for every 10 gallons of solvent in the dry cleaning units work tank 13 fluid ounces of additive is added to the solvent and mixed inside the wash wheel of the dry cleaning unit. The 1 vol % charge is maintained by adding detergent or sizing additives every time clean or distilled solvent is added to the working tank.

Accordingly, five ounces of the test product described above was injected on every load into a 35 pound dry cleaning unit containing silicone fluid dry cleaning solvent via a programmable peristaltic injection devise. The cleaned garments exhibited an improved hand or feel. The garments were luxurious in appearance, had better drape, and had a pronounced firmer body. For example, a cotton Khaki pair of slacks was included in load of garments cleaned in silicone solvent containing the above sizing product. An identical pair of cotton Khaki slacks was cleaned via a home laundry machine using a convectional laundry detergent. The two slacks were presented to a panel of five (5) people who observed the slacks and in a blind test felt the slacks. All observed a difference in appearance and in fabric hand/feel between the two pair of slacks. The garment dry cleaned in the presence of the above sizing agent was universally declared to have enhanced appearance and fabric body/hand and was judged to be superior to the garment that was laundered.

As used herein and in the appended claims, the singular forms "a", "an", and the include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and/or method and examples shown and described. The various features of exemplary embodiments described herein may be used in any combination. Accordingly, departures may be made from such details without departing from the scope of the general inventive concept.

What we claim are:

1. A method for applying a fabric treatment composition to a fabric article in a dry cleaning appliance having a treatment chamber, said method comprising the steps of:
   (a) dispensing a fabric treatment composition into the treatment chamber, wherein the fabric treatment composition includes a sizing agent comprising a hydrogenated rosin ester, and a silicone solvent; and
   (b) contacting the fabric article with the fabric treatment composition.

2. The method of claim 1, wherein the hydrogenated rosin ester is a polyol ester of a hydrogenated rosin acid.

3. The method of claim 2, wherein the polyol ester comprises a polyol moiety selected from the group consisting of glycerol, pentaerythritol, and triethylene glycol.

4. The method of claim 1, wherein the hydrogenated rosin ester comprises a hydrogenated wood rosin.

5. The method of claim 1, wherein the fabric treatment composition further comprises:
   a dispersing agent; and
   a co-solvent.

6. The method of claim 1, wherein an operative mixture of the fabric treatment composition comprises about 0.1 wt % to about 5 wt % of the sizing agent, wherein the weight percent is based on the total weight of the operative mixture.

7. The method of claim 6, wherein the operative mixture of the composition comprises about 0.2 wt % to about 2 wt % of the sizing agent.

8. The method of claim 1 further comprising:
   (c) providing a concentrated mixture of the fabric treatment composition, the composition comprising
      about 25 wt % to about 45 wt % of the sizing agent;
      about 25 wt % to about 35 wt % of the silicone solvent;
      about 2 wt % to about 15 wt % of a dispersing agent; and
      about 25 wt % to about 35 wt % of a co-solvent,
   wherein the weight percent is based on the total weight of the concentrated mixture.

9. The method of claim 8 further comprising:
   (d) diluting the concentrated mixture with an additional amount of the silicone solvent to form an operative mixture of the fabric treatment composition.

10. The method of claim 1, further comprising:
    (e) placing the fabric article into the drying cleaning appliance; and
    (f) evaporating at least a portion of the silicone solvent after the contacting step (b) to thereby provide the fabric article with at least a portion of the sizing agent retained thereon.

* * * * *